(12) United States Patent
Steichen et al.

(10) Patent No.: US 11,306,827 B2
(45) Date of Patent: Apr. 19, 2022

(54) SLIDE VALVE

(71) Applicant: TMT TAPPING-MEASURING-TECHNOLOGY SARL, Luxembourg (LU)

(72) Inventors: Charles Steichen, Ettelbruck (LU); Patrick Hutmacher, Bettembourg (LU)

(73) Assignee: TMT TAPPING-MEASURING-TECHNOLOGY SARL, Luxembourg (LU)

( * ) Notice: Subject to any disclaimer, the term of this patent is extended or adjusted under 35 U.S.C. 154(b) by 0 days.

(21) Appl. No.: 16/754,908

(22) PCT Filed: Nov. 9, 2017

(86) PCT No.: PCT/EP2017/078798
§ 371 (c)(1),
(2) Date: Apr. 9, 2020

(87) PCT Pub. No.: WO2019/091563
PCT Pub. Date: May 16, 2019

(65) Prior Publication Data
US 2020/0263794 A1    Aug. 20, 2020

(51) Int. Cl.
*F16K 3/02* (2006.01)
*F16K 3/22* (2006.01)
(Continued)

(52) U.S. Cl.
CPC .............. *F16K 3/0272* (2013.01); *F16K 3/20* (2013.01); *F16K 3/22* (2013.01); *F16K 27/04* (2013.01);
(Continued)

(58) Field of Classification Search
CPC . F16K 3/0272; F16K 3/20; F16K 3/22; F16K 27/04; F16K 27/044; F16K 31/523; F16K 3/207; F16K 27/045; F16K 1/20; F16K 27/0227; F16K 13/02; F16K 3/312; F27B 1/10; F27D 99/0073
See application file for complete search history.

(56) References Cited

U.S. PATENT DOCUMENTS 384,849 A * 6/1888 Hood ...................... F16K 5/162
                                                          251/164
1,874,627 A    8/1932 Riley
(Continued)

FOREIGN PATENT DOCUMENTS

CN         2403961 Y    11/2000
CN       206017821 U     3/2017
(Continued)

*Primary Examiner* — Marina A Tietjen
(74) *Attorney, Agent, or Firm* — Dickinson Wright PLLC; Andrew D. Dorisio

(57) ABSTRACT

The invention relates to a slide valve (20) having a slide valve plate (32) movable in a slide valve rail (29) between a locked position and an open position in a slide valve casing (26), said slide valve rail (29) being provided with a slide valve seal for attaining a gas-proof locked position, said slide valve rail (29) being connected to the slide valve casing (26) via a flange connection in such a manner that the slide valve rail (29) is removable from the slide valve casing (26) radially to a flow axis of the slide valve (20).

20 Claims, 6 Drawing Sheets

(51) Int. Cl.
  *F16K 27/04*  (2006.01)
  *F16K 3/20*  (2006.01)
  *F27B 1/10*  (2006.01)
  *F27D 99/00*  (2010.01)
  *F16K 31/52*  (2006.01)

(52) U.S. Cl.
  CPC ............ *F16K 27/044* (2013.01); *F27B 1/10* (2013.01); *F27D 99/0073* (2013.01); *F16K 31/523* (2013.01)

(56) References Cited

U.S. PATENT DOCUMENTS

| | | | | |
|---|---|---|---|---|
| 4,444,214 | A * | 4/1984 | Paul, Jr. ................ | F16K 17/16 137/68.28 |
| 5,035,258 | A * | 7/1991 | Garnham ............. | F16K 3/0272 137/454.2 |
| 6,220,282 | B1 * | 4/2001 | Powell .................... | E03C 1/106 137/315.11 |
| 6,497,245 | B1 * | 12/2002 | Torii ........................ | F02D 9/10 123/337 |

FOREIGN PATENT DOCUMENTS

| | | |
|---|---|---|
| DE | 4000139 A1 | 7/1991 |
| JP | 2004512486 A | 4/2004 |
| JP | 2016521340 A | 7/2016 |
| RU | 2350814 C1 | 3/2009 |
| RU | 2467235 C2 | 5/2010 |
| WO | 0237001 A2 | 5/2002 |
| WO | 2017124192 A1 | 7/2017 |

* cited by examiner

Fig. 1
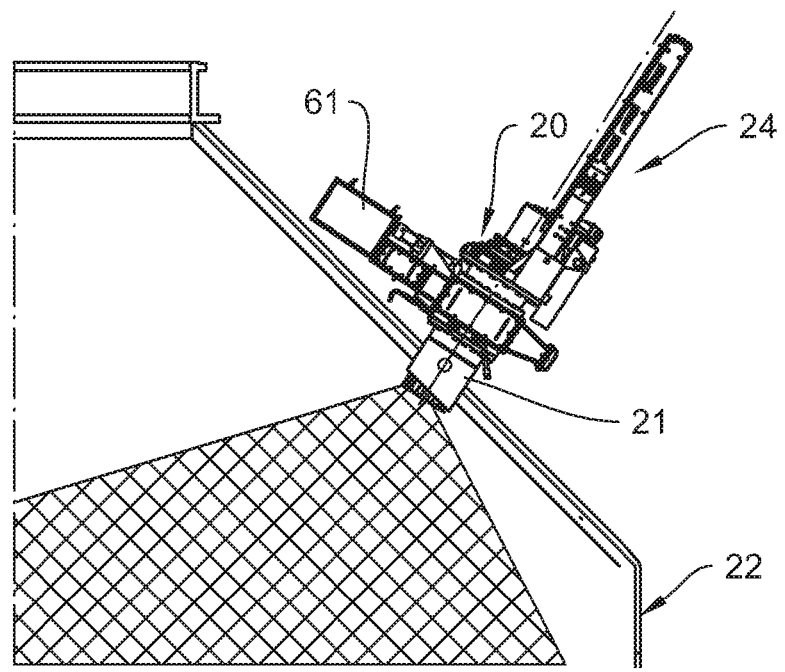
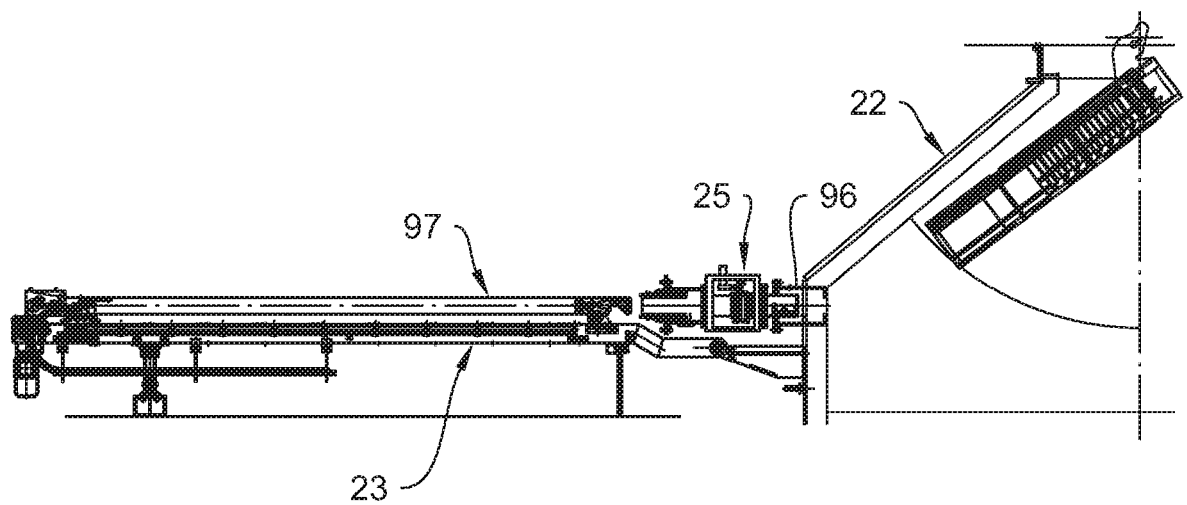
Fig. 2

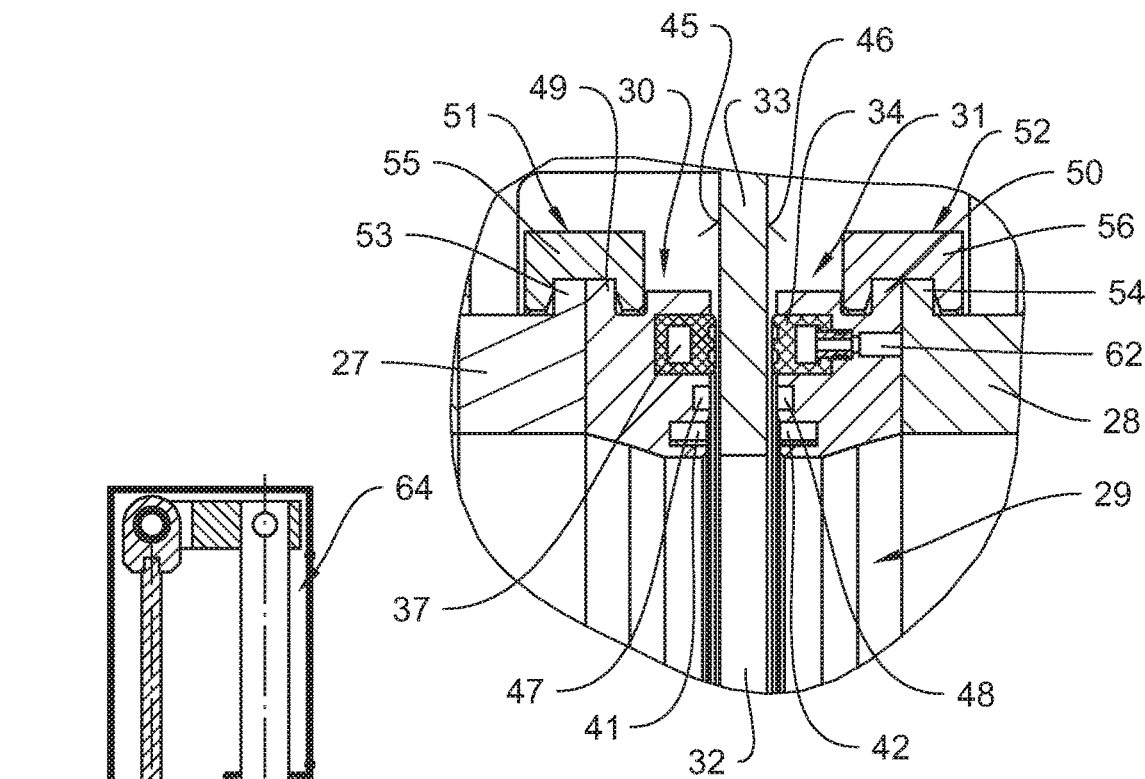
Fig. 6
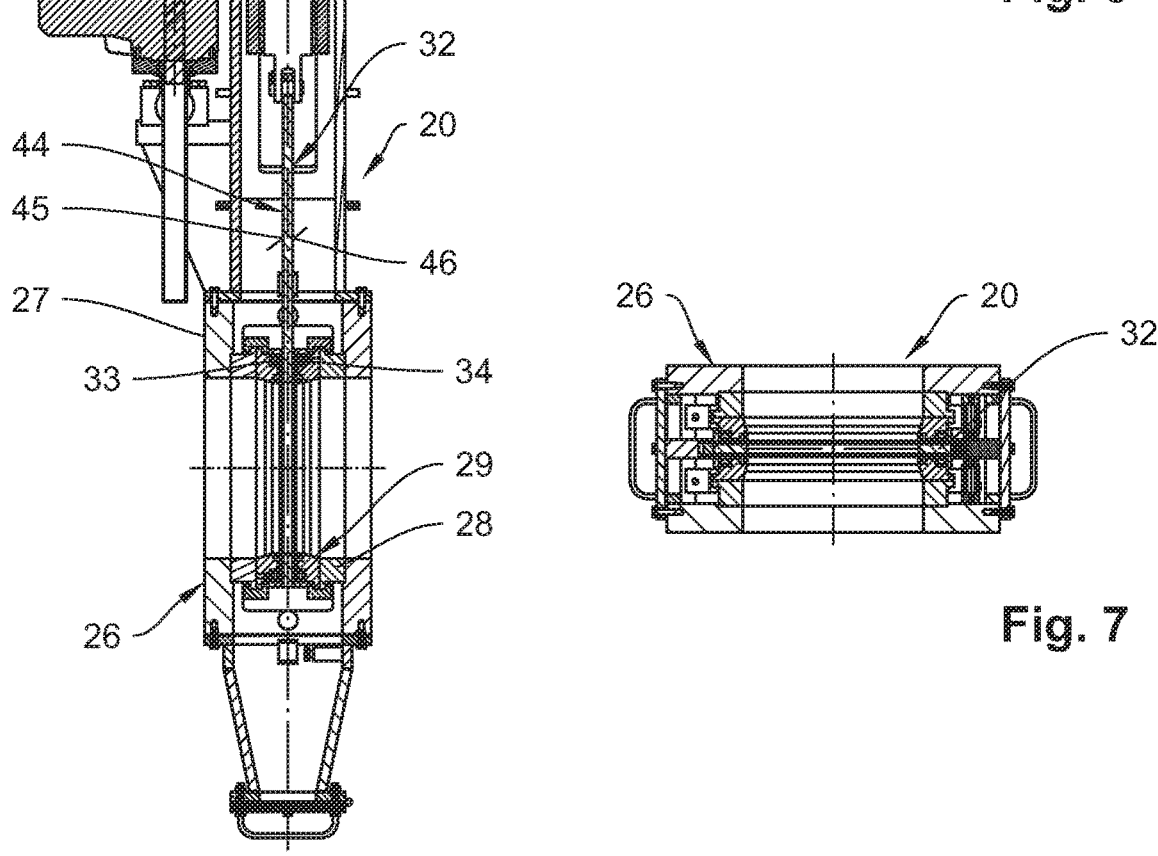
Fig. 5
Fig. 7

Fig. 8
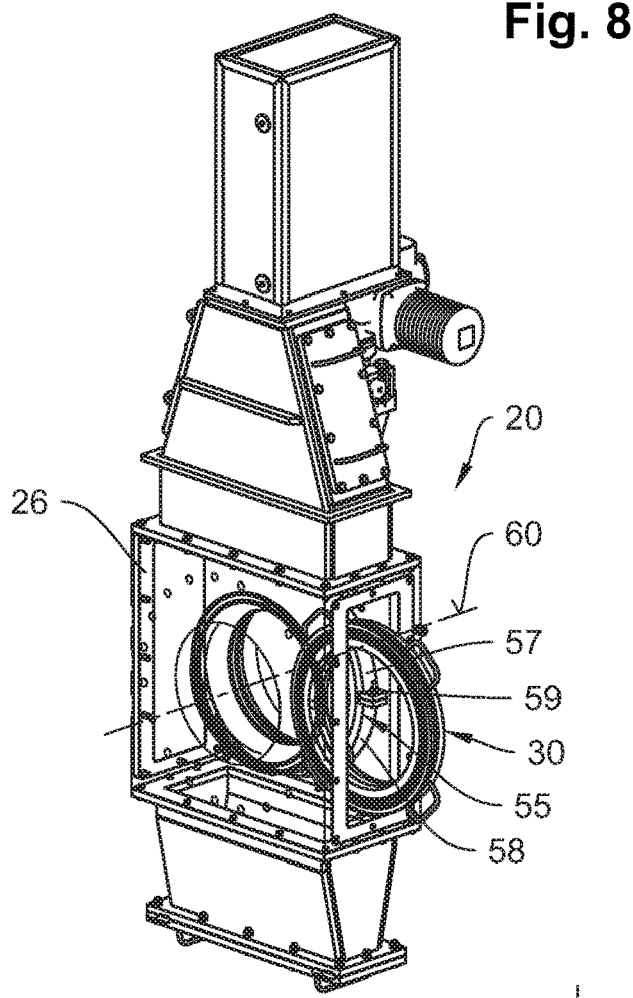
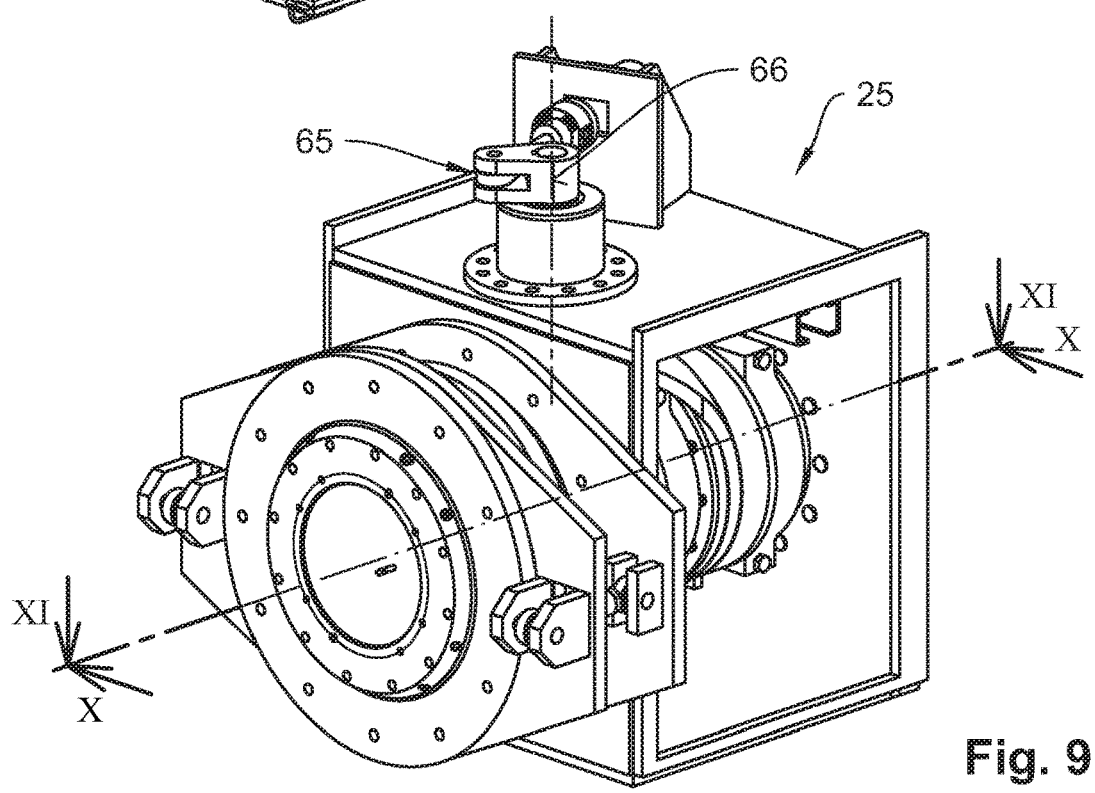
Fig. 9

Fig. 10
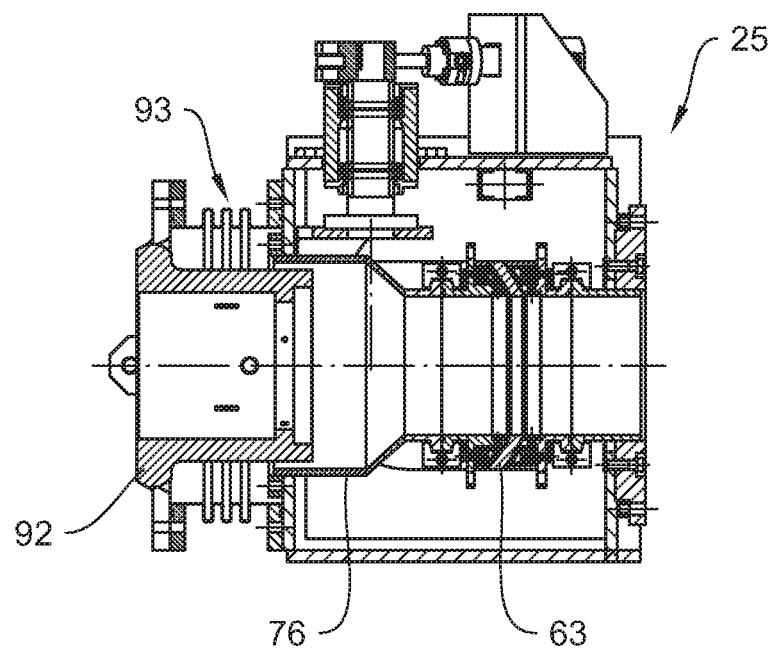
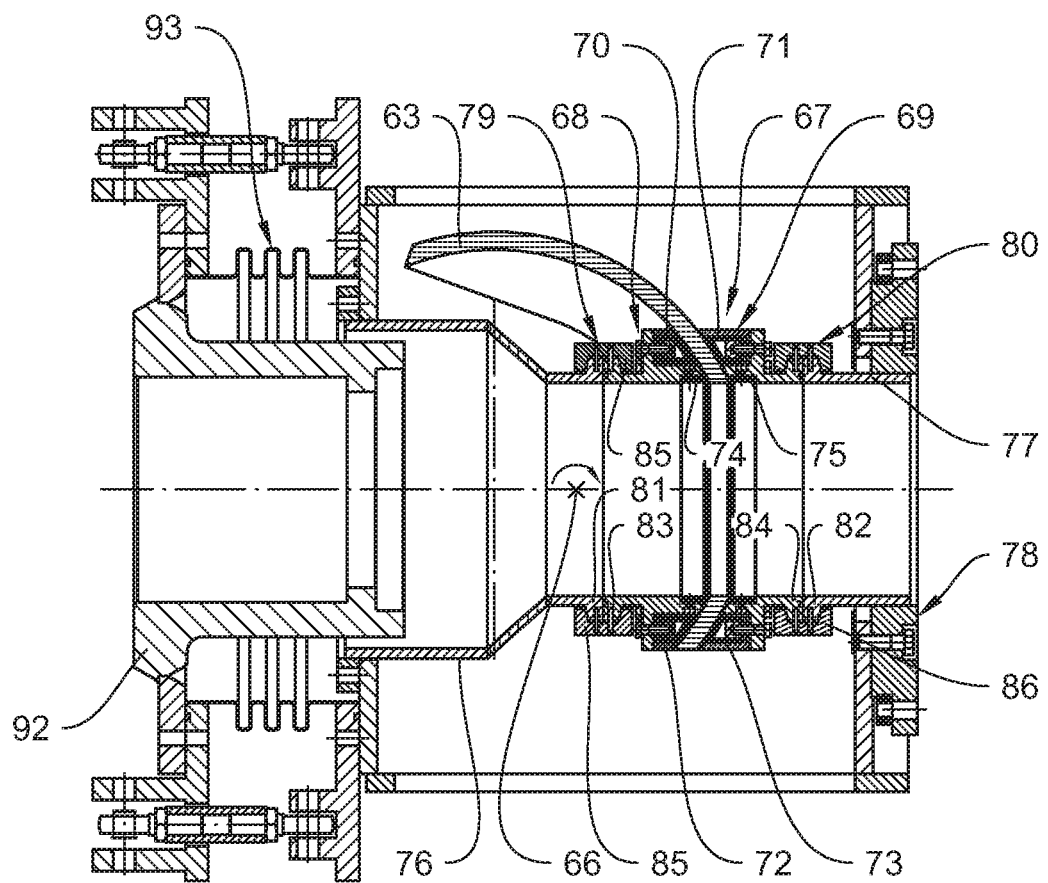
Fig. 11

Fig. 12
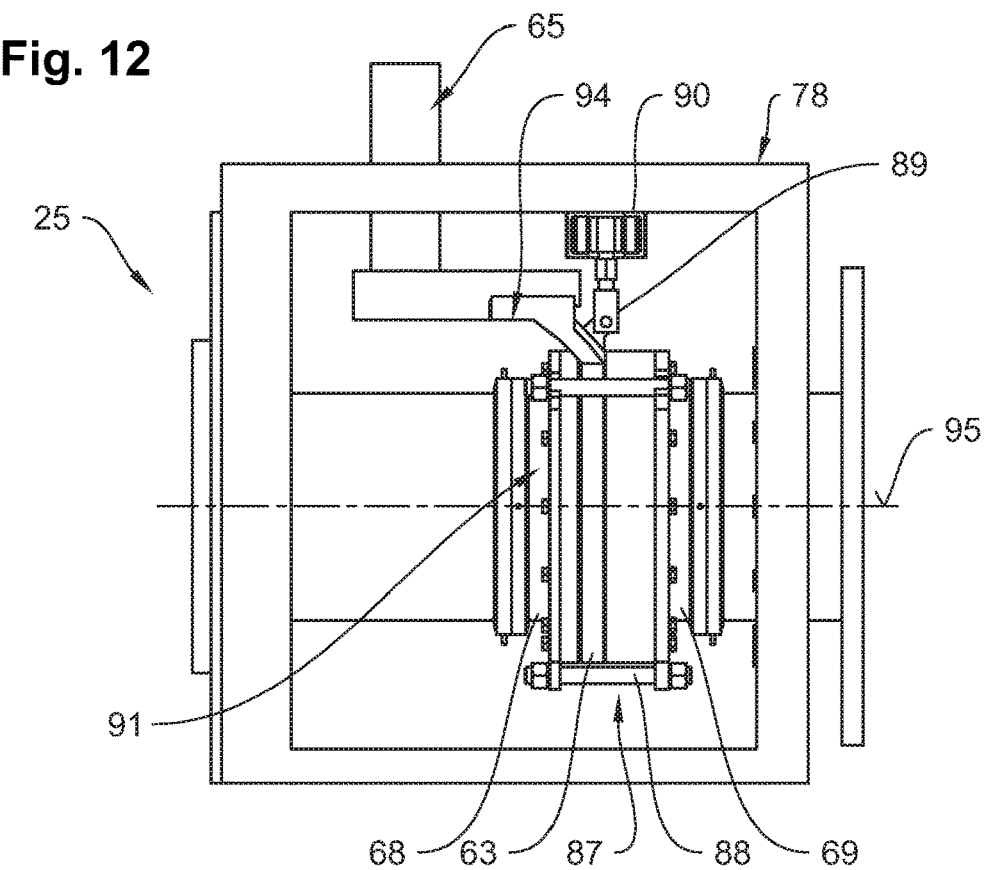
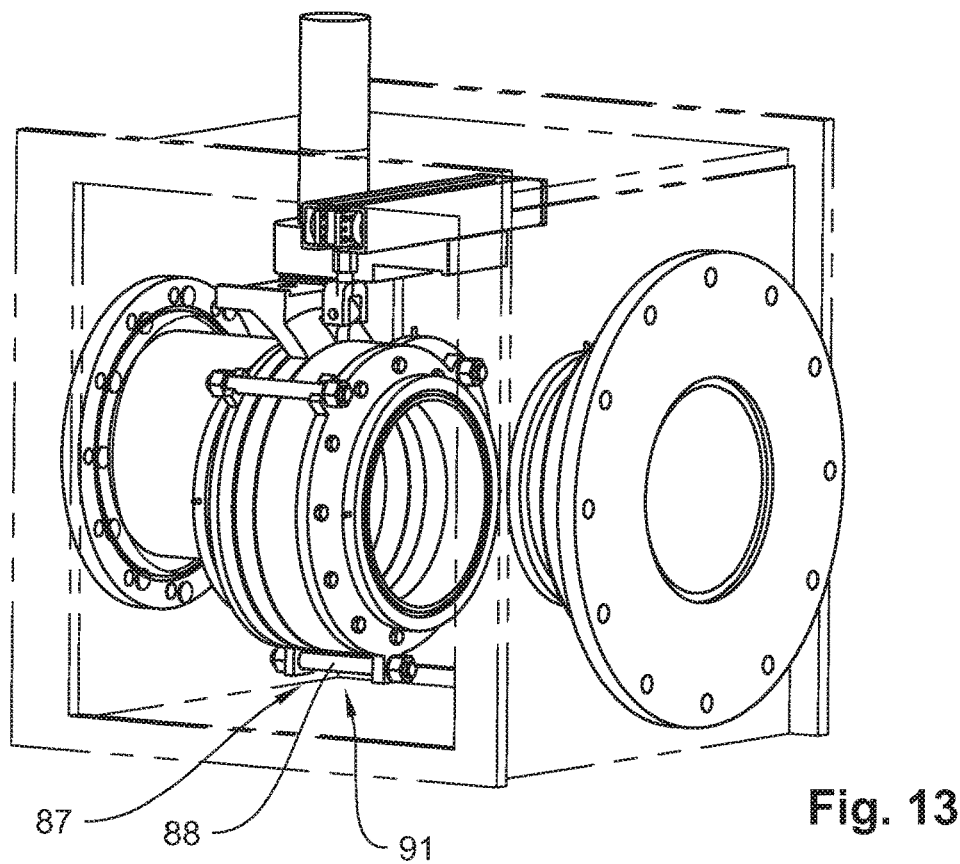
Fig. 13

SLIDE VALVE

FIELD OF THE INVENTION

The present invention relates to a slide valve having a slide valve plate movable in a slide valve rail between a locked position and an open position in a slide valve casing, said slide valve rail being provided with a slide valve seal for attaining a gas-proof locked position.

BACKGROUND OF THE INVENTION

Slide valves of the type mentioned above serve in particular for a gas-tight connection of a connection nozzle disposed on a blast furnace and serving to connect measuring probes which can be inserted into the blast furnace via the connection nozzle. The slide valves must ensure that neither gas nor dust or charge materials can escape from the blast furnace into the environment of the blast furnace when in the locked position.

Owing to the constant exposure to the blast furnace atmosphere and the constant wear of the slide valve plates when inserting and extracting the measuring probe, the slide valves become greatly worn, making a correspondingly frequent maintenance of the slide valves necessary in order to guarantee their flawless operation.

In known slide valves, the slide valve plate which is provided with a slide valve seal for attaining a gas-proof locked position is disposed between casing parts of the slide valve casing so the slide valve casing has to be taken apart when performing maintenance, such as in particular exchanging the slide valve seal.

DE 40 00 139 A1, for example, shows a slide valve which comprises the slide valve plate in a disposition between an upper casing part and a lower casing part, the slide valve seal being disposed adjacent to the slide valve plate in a seal reception in the upper casing part.

SUMMARY OF THE INVENTION

The object of the present invention is to propose a slide valve which enables carrying out maintenance measures more simply for the slide valve seal.

According to the invention, the slide valve rail is connected to the slide valve casing via a flange connection in such a manner that the slide valve rail can be removed from the slide valve casing radially to a flow axis of the slide valve.

Unlike the known slide valves in which the slide valve plate is disposed between the upper casing part and the lower casing part so a slide valve rail is formed via the casing itself, the slide valve rail can be removed from the casing in conjunction with the slide valve seal in the slide valve according to the invention. The casing consequently no longer has to be taken apart in order to exchange the slide valve seal. In fact the slide valve rail can be radially removed from the slide valve casing so that the slide valve casing can remain in its place while the slide valve seal is exchanged, thus minimizing the required mounting effort required for exchanging a slide valve seal.

Preferably, the slide valve rail has two rail halves which are each provided with a sealing element of the slide valve seal serving to seal one of two vis-à-vis slide valve plate surfaces. Through this a doubly effective seal of the slide valve plate, which enables a seal of the slide valve plate against the high furnace atmosphere as well as a seal of the slide valve plate against the environment, is realized in addition to the simplified maintenance of the slide valve.

If the rail halves each comprise an axial support device for support on both sides against the slide valve plate surfaces, a defined seal force, by means of which the seal elements abut against the slide valve plate surfaces, can be adjusted with respect to the rail halves via a distance of the slide valve plate set by the axial support device in particular when interacting with pneumatically pressurized seal elements.

Preferably, the rail halves comprise a circular flange at a casing connection side for forming the flange connection as a clamp connection using a circular flange formed at a casing part of the slide valve casing. Such a clamp connection enables a simple unmounting of the rail halves via a radial removal of the rail halves from the slide valve casing, which remains in its place, following the release of the clamp connections in particular in the event that a clamping ring or locking ring combined with the vis-à-vis circular flanges is intended for forming the clamp connection.

Preferably the guide halves comprise a seal carrier for disposing the seal element and which serves for being connected to a casing part of the slide valve casing.

Preferably, the rail halves can be removed individually from the slide valve casing so the masses to be handled when exchanging the slide valve seal are kept as low as possible.

If the rail halves can be removed as a connected mounting unit from the slide valve casing, it becomes possible to remove both rail halves at the same time in one mounting procedure, it proving to be particularly advantageous if the slide valve plate forms a component of the mounting unit comprising the rail halves. Such an embodiment makes it possible to reduce the time expenditure connected to a maintenance process to a minimum since the slide valve plate is exchangeable in a mounting or handling process in conjunction with the rail halves and thus no time expenditure is required for combining the rail halves with the slide valve plate.

If the rail halves are realized different to each other, the rail halves can be adjusted in particular to different surfaces of the slide valve plate surfaces.

In order to guarantee the relative arrangement of the slide valve plate received between the rail halves during the mounting process, it is advantageous if the rail halves are connected to each other having the slide valve plate disposed therebetween and using a temporary mounting safeguard in order to realize the mounting unit.

A particularly simple embodiment of a mounting safeguard becomes possible if the rail halves are braced against each other using axial bracing devices.

In a specific embodiment of the slide valve, the rail halves are realized differently to each other and the slide valve plate is shaped like a cup.

In such an embodiment of the slide valve, it is particularly advantageous if the rail halves comprise a seal carrier for disposing the seal element, said seal carrier at the same time serving to realize a support device in such a manner that the support device forms a reception for the seal element. Thus, a particularly compact embodiment of the rail halves becomes possible in which the support device fulfills multiple functions.

BRIEF DESCRIPTION OF THE DRAWING FIGURES

In the following, preferred embodiments of the invention are further described by means of the drawings.

FIG. 1 illustrates in a frontal view a slide valve disposed on a blast furnace periphery and realized as a flat gate valve;

FIG. 2 illustrates in a frontal view a slide valve disposed on a blast furnace periphery and realized as a cup valve;

FIG. 5 illustrates in a cross-sectional view the flat gate valve illustrated in FIG. 3 according to cut V-V;

FIG. 6 illustrates an enlarged detailed view of the flat gate valve illustrated in FIG. 5;

FIG. 7 illustrates a cross-sectional view the flat gate valve illustrated in FIG. 3 according to cut VII-VII;

FIG. 8 illustrates the flat gate valve illustrated in FIG. 3 while a rail half of a slide valve rail is being unmounted;

FIG. 9 illustrates in an isometric view the cup valve illustrated in FIG. 2;

FIG. 10 illustrates the cup valve illustrated in FIG. 9 according to cut X-X;

FIG. 11 illustrates the cup valve illustrated in FIG. 9 according to cut XI-XI;

FIG. 12 illustrates a lateral view of the cup valve illustrated in FIG. 9 having a mounting unit made up of the slide valve plate and the rail halves before being removed from the slide valve casing;

FIG. 13 illustrates the mounting unit illustrated in FIG. 12 while being removed from the slide valve casing.

DETAILED DESCRIPTION OF THE INVENTION

Figure 3:
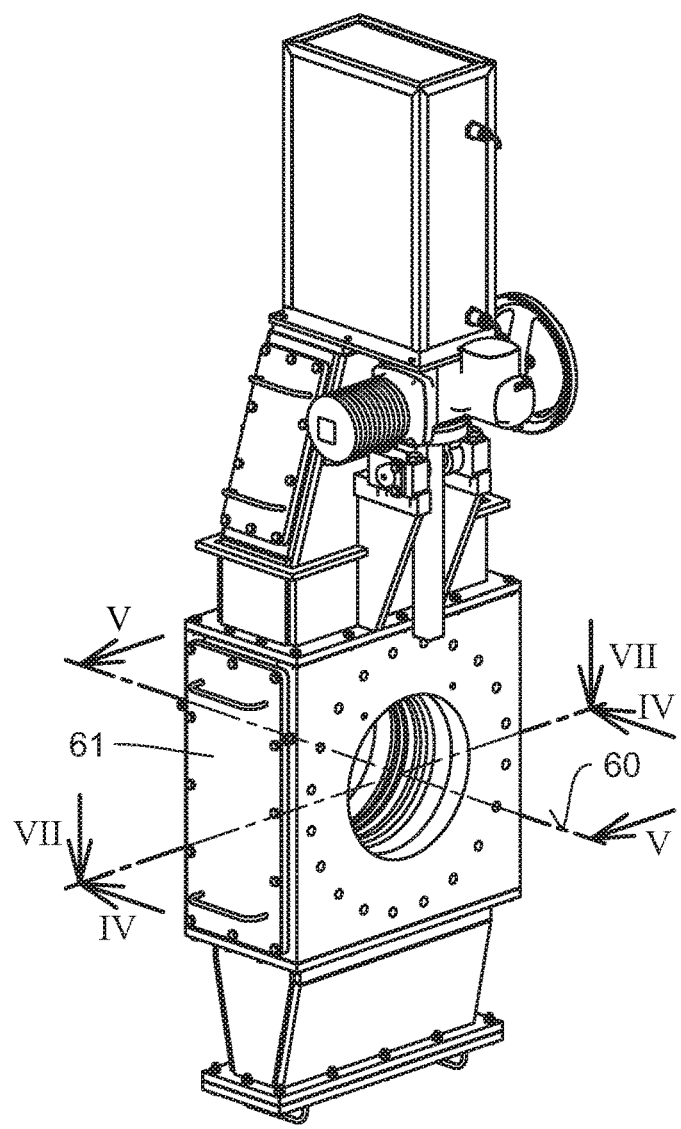
FIG. 3 illustrates in an isometric view the flat gate valve illustrated in FIG. 1.
Figure 4:
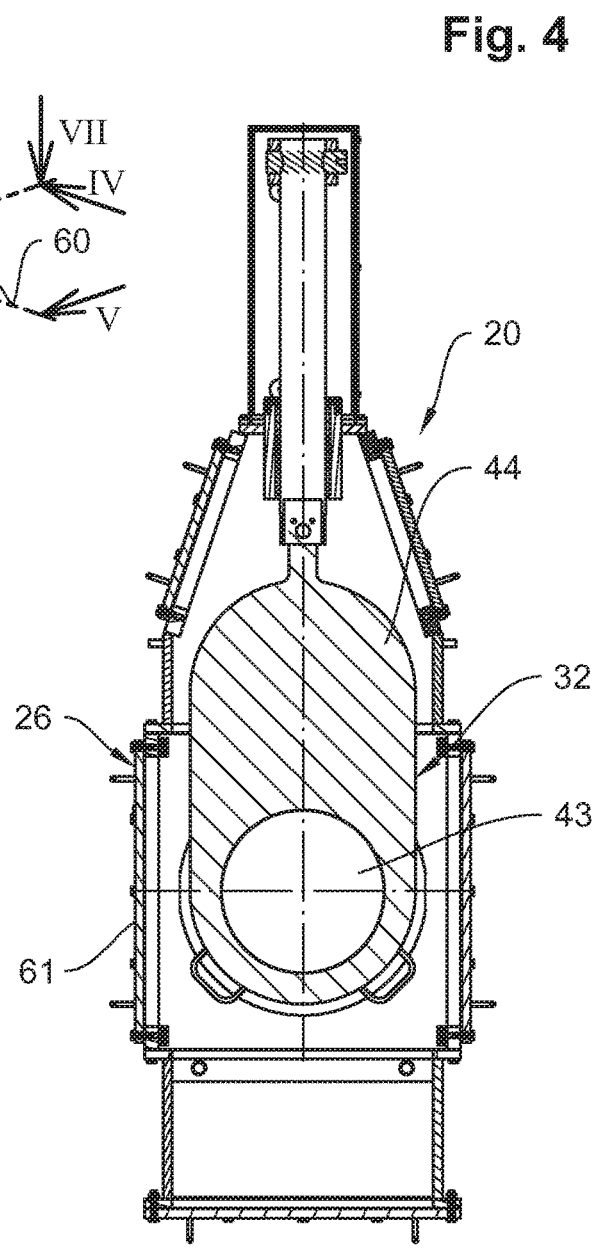
FIG. 4 illustrates in a cross-sectional view the flat gate valve illustrated in FIG. 3 according to cut IV-IV.

FIG. 1 illustrates in a frontal view a slide valve 20 which is realized as a flat gate valve, is connected to a connection nozzle 21 of a blast furnace 22 in a blast furnace periphery and enables the gas-proof connection of a measuring probe 24 which can be inserted into the interior of the blast furnace 22 via a through opening 43 of a slide valve plate 32 illustrated in particular in FIG. 4 after the slide valve 20 has been moved from its locked position to its open position. FIG. 2 illustrates a corresponding disposition in which a slide valve 25 realized as a cup valve is connected to a connection nozzle 96 of the blast furnace 22, said slide valve 25 enabling the gas-proof connection of a measuring probe 97 disposed on a carriage 23.

As can be seen in particular in a synopsis of FIGS. 3 to 7, slide valve 20 realized in this instance as a flat gate valve comprises a slide valve casing 26 which, as illustrated in particular in FIG. 6, comprises a slide valve rail 29 having two rail halves 30, 31 between two housing parts 27, 28, a slide valve plate 32 realized as a flat plate in the instance of slide valve 20 illustrated here and realized as a flat gate valve being disposed between rail halves 30, 31.

As can be seen in particular in FIG. 6, the rail halves 30, 31 each comprise a seal element 33, 34. The seal elements 33, 34 are realized as pneumatic tube seals in this instance and therefore comprise a cavity 37 which can be pressurized with gas via a pressure pipe 62.

Besides seal elements 33, 34, rail halves 30, 31 comprise strippers 41, 42 which strip any dirt particles clinging to a closure section 44 above through opening 43 from slider plate surfaces 45, 46 when moving slide valve plate 32 into its open position illustrated in FIGS. 3 to 7 in order to protect seal elements 33, 34 from any impairments via dirt particles.

As in particular FIG. 6 illustrates, rail halves 30, 31 in the present instance moreover enable disposing one axial support device 47, 48 which serve to support the slide valve blade surfaces 45, 46 on both sides in each instance and can be realized as PTFE rings, for example.

FIG. 6 illustrates that rail halves 30, 31 each comprise a circular flange 49, 50 which are each disposed adjacent to a circular flange 53, 54 at the abutting casing part 27, 28 for forming a clamp connection 51, 52, said circular flanges 49, 53 or 50, 54 being braced against each other in the illustrated relative arrangement via two clamping rings 55, 56 realized in two parts.

As can be seen in particular in FIG. 8, each rail half 30, 31 can be radially removed from slide valve casing 26 with reference to a flow axis 60 of slide valve 20 after removing the respective clamp connection 51, 52 (FIG. 6) by releasing bolt connections 59, which each connect two half rings 57, 58 of clamping rings 55, 56 with each other, after merely a side lid 61 of the casing has been removed.

As in particular a synopsis of FIGS. 1 and 6 clearly illustrates, slide valve 20 can remain in its position at connection nozzle 21 of blast furnace 22 in order to remove side lid 61 and the following unmounting of rail halves 30, 31 of the slide valve rail 29.

FIG. 9 illustrates in an isometric view slide valve 25 realized in this instance as a cup valve and illustrated in its relative disposition to a blast furnace 22 in FIG. 2. As becomes clear in particular in the cross-sectional view according to FIG. 11, slide valve 25 comprises a spherical slide valve plate 63 which is referred to as a cup in this instance and, unlike slide valve plate 32 of slide valve 20 which is realized as a flat plate, is not provided with a translational drive device 64 (cf. FIG. 5) for translationally moving slide valve plate 32 from an open position to a locked position and vice versa but comprises a rotary drive 65 (cf. FIGS. 9 and 12) which, as indicated in FIG. 11 via the arrow, performs a rotary movement around a pivot axis 66 in order to move slide valve plate 63 from the illustrated open position to a locked position.

As FIG. 11 illustrates, a slide valve rail 67 of slide valve 25 comprises two different rail halves 68, 69 for being adjusted to the spherical embodiment of slide valve plate 63, said rail halves 68, 69 each comprising a seal carrier 72, 73 for disposing a seal element 70, 71 and simultaneously for forming an axial support device in such a manner that the support devices form a reception for seal elements 70, 71.

Corresponding to rail halves 30, 31 of slide valve 20, rail halves 68, 69 of slide valve 62 are each provided with a stripper 74, 75. In order to each be connected to a casing part 76, 77 of a slide valve casing 78, clamp connections 79, 80 are provided between the halves 68, 69 and casing parts 76, 77 in such a manner that casing parts 76, 77 and rail halves 68, 69 are each adjacently provided with circular flanges 81, 82 or 83, 84 which, as previously described with reference to FIGS. 6 and 8, are braced against each other via clamping rings 85, 86 realized in two parts.

For unmounting rail halves 68, 69, rail halves 68, 69 and slide valve plate 63 received between rail halves 68, 69 are combined to a mounting unit 91 by means of a temporary mounting safeguard 87 which has three bolt connections 88 in this instance which brace rail halves 68, 69 against slide valve plate 63 disposed therebetween, as illustrated in FIGS. 12 and 13. Only after mounting safeguard 87 has been inserted are clamp connections 79, 80 between rail halves 68, 69 and casing parts 76, 77 as well as a coupling 94 realized between rotary drive 65 and slider plate valve 63 released. Subsequently, mounting unit 91, which is connected via an actuator 89 to a mounting rail 91 disposed at a slide valve casing 78, can be removed from slide valve casing 78 radially to a flow axis 95 of slide valve 25 in a load-relieving manner for the technician.

As can be seen in particular in FIGS. 9 to 11, slide valve casing 78 of slide valve 25 is provided with a packed valve 92 for being connected to measuring probe 24 illustrated in FIG. 2, said packed valve 92 enabling a variable entrance angle of measuring probe 24 into blast furnace 21 via a compensator 93 via the disposition formed by packed valve 92 and slide valve 25. As FIG. 1 illustrates, a corresponding disposition is also intended for slide valve 20.

The above makes clear that slide valve rails 29 or 67 provided with seal elements 33, 34 or 70, 71 can be exchanged at slide valve 20 and at slide valve 25 not only by maintaining the installed position of slide valve 20, 25 at blast furnace 22 but also by in particular a separation of slide valve casing 26, 78 of slide valve 20, 25 from connected components, such as in particular the packed valves 92 each connected to slide valve casing 26, 78 via compensator 93, not being required.

The invention claimed is:

1. A slide valve (20, 25) having a slide valve plate (32, 63) movable in a slide valve rail (29, 67) between a locked position and an open position in a slide valve casing (26, 78), said slide valve rail (29, 67) being provided with a slide valve seal for attaining a gas-proof locked position, characterized in that the slide valve rail (29, 67) is connected to the slide valve casing (26, 78) via a flange connection in such a manner that the slide valve rail (29, 67) is removable from the slide valve casing (26, 78) radially to a flow axis (60, 95) of the slide valve (20, 25) so that the slide valve casing (26, 78) may remain in place while the slide valve seal is exchanged, wherein the slide valve rail (29, 67) has two rail halves (30, 31; 68, 69), each including a seal element (33, 34; 70, 71) for sealing against a slide valve plate surface (45, 46) to form the slide valve seal, wherein the rail halves (30, 31) are removable from the slide valve casing (26) independently of each other.

2. The slide valve according to claim 1, characterized in that the rail halves (30, 31; 68, 69) each comprise an axial support device (47, 48) for supporting against the slide valve plate surfaces (45, 46) on both sides.

3. The slide valve according to claim 1, characterized in that at a casing connection side, the rail halves (30, 31; 68, 69) have a circular flange (49, 50; 83, 84) for forming the flange connection as a clamp connection (51, 52; 79, 80) using a circular flange (53, 54; 81, 82) formed at a casing part (27, 28; 76, 77) of the slide valve casing (26, 78).

4. The slide valve according to claim 1, characterized in that the rail halves (30, 31) comprise a seal carrier (35, 36) for disposing the seal element (33, 34), said seal carrier (35, 36) serving for being connected to a casing part (27, 28) of the slide valve casing (26).

5. The slide valve according claim 1, characterized in that the rail halves (30, 31) are realized differently to each other.

6. The slide valve according to claim 1, characterized in that the slide valve plate (63) is a component of a mounting unit (91).

7. The slide valve according to claim 6, characterized in that for forming the mounting unit (91), the rail halves (68, 69) are connected to each other having the slide valve plate (63) therebetween and by means of a temporary mounting safeguard (87).

8. The slide valve according to claim 7, characterized in that for forming the mounting safeguard (87), the rail halves (68, 69) are braced against each other using axial bracing devices.

9. The slide valve according to claim 8, characterized in that the rail halves (68, 69) are formed differently to each other and the slide valve plate (63) is shaped like a cup.

10. The slide valve according to claim 9, characterized in that for disposing the seal element (70, 71), the rail halves (68, 69) comprise a seal carrier (72, 73) which simultaneously serves for forming a support device in such a manner that the support device forms a reception for the seal element (70, 71).

11. A slide valve (20, 25) having a slide valve plate (32, 63) movable in a slide valve rail (29, 67) between a locked position and an open position in a slide valve casing (26, 78), said slide valve rail (29, 67) being provided with a slide valve seal for attaining a gas-proof locked position, characterized in that the slide valve rail (29, 67) is connected to the slide valve casing (26, 78) via a flange connection in such a manner that the slide valve rail (29, 67) is removable from the slide valve casing (26, 78) radially to a flow axis (60, 95) of the slide valve (20, 25) so that the slide valve casing (26, 78) may remain in place while the slide valve seal is exchanged, wherein the slide valve rail (29, 67) has two rail halves (30, 31; 68, 69), each including a seal element (33, 34; 70, 71) for sealing against a slide valve plate surface (45, 46) to form the slide valve seal, wherein that the rail halves (30, 31; 68, 69) each comprise an axial support device (47, 48) for supporting against the slide valve plate surfaces (45, 46) on both sides.

12. The slide valve of claim 11, wherein the rail halves (30, 31) are removable from the slide valve casing (26) independently of each other.

13. The slide valve of claim 11, wherein the rail halves (68, 69) are removable from the slide valve casing (78) as a connected mounting unit (91).

14. The slide valve of claim 11, wherein the rail halves (30, 31) are realized differently to each other.

15. The slide valve according to claim 11, wherein at a casing connection side, the rail halves (30, 31; 68, 69) have a circular flange (49, 50; 83, 84) for forming the flange connection as a clamp connection (51, 52; 79, 80) using a circular flange (53, 54; 81, 82) formed at a casing part (27, 28; 76, 77) of the slide valve casing (26, 78).

16. A slide valve (20, 25) having a slide valve plate (32, 63) movable in a slide valve rail (29, 67) between a locked position and an open position in a slide valve casing (26, 78), said slide valve rail (29, 67) being provided with a slide valve seal for attaining a gas-proof locked position, characterized in that the slide valve rail (29, 67) is connected to the slide valve casing (26, 78) via a flange connection in such a manner that the slide valve rail (29, 67) is removable from the slide valve casing (26, 78) radially to a flow axis (60, 95) of the slide valve (20, 25) so that the slide valve casing (26, 78) may remain in place while the slide valve seal is exchanged, wherein the slide valve rail (29, 67) has two rail halves (30, 31; 68, 69), each including a seal element (33, 34; 70, 71) for sealing against a slide valve plate surface (45, 46) to form the slide valve seal, wherein at a casing connection side, the rail halves (30, 31; 68, 69) have a circular flange (49, 50; 83, 84) for forming the flange connection as a clamp connection (51, 52; 79, 80) using a circular flange (53, 54; 81, 82) formed at a casing part (27, 28; 76, 77) of the slide valve casing (26, 78).

17. The slide valve of claim 16, wherein the rail halves (30, 31) are removable from the slide valve casing (26) independently of each other.

18. The slide valve of claim 16, wherein the rail halves (68, 69) are removable from the slide valve casing (78) as a connected mounting unit (91).

19. The slide valve of claim 16, wherein the rail halves (30, 31) are realized differently to each other.

20. The slide valve according to claim 16, wherein the rail halves (30, 31; 68, 69) each comprise an axial support device (47, 48) for supporting against the slide valve plate surfaces (45, 46) on both sides.

\* \* \* \* \*